US009261690B2

(12) United States Patent
Fukutake et al.

(10) Patent No.: US 9,261,690 B2
(45) Date of Patent: Feb. 16, 2016

(54) MICROSCOPE SYSTEM (75) Inventors: Naoki Fukutake, Tokyo (JP); Hiroki Yazawa, Tokyo (JP); Shigeru Nakayama, Yokohama (JP); Shinichi Nakajima, Tokyo (JP)

(73) Assignee: NIKON CORPORATION, Tokyo (JP)

(*) Notice: Subject to any disclaimer, the term of this patent is extended or adjusted under 35 U.S.C. 154(b) by 576 days.

(21) Appl. No.: 13/359,164

(22) Filed: Jan. 26, 2012

(65) Prior Publication Data

US 2012/0293644 A1    Nov. 22, 2012

Related U.S. Application Data (60) Provisional application No. 61/534,155, filed on Sep. 13, 2011.

(30) Foreign Application Priority Data

May 18, 2011   (JP) .............................. P2011-111032

(51) Int. Cl.
  H04N 7/18    (2006.01)
  H04N 9/47    (2006.01)
  G02B 21/14   (2006.01)
  G02B 21/36   (2006.01)

(52) U.S. Cl.
  CPC .............. *G02B 21/14* (2013.01); *G02B 21/365* (2013.01); *G02B 21/367* (2013.01)

(58) Field of Classification Search
  CPC ........................... G02B 21/365; G02B 21/367
  USPC .......................................................... 348/79
  See application file for complete search history.

(56) References Cited

U.S. PATENT DOCUMENTS 6,795,238 B2   9/2004  Masuyama
6,839,166 B2   1/2005  Fukushima et al.
(Continued)

FOREIGN PATENT DOCUMENTS

EP     1750154       2/2007
JP     A-2001-290079  10/2001
(Continued)

OTHER PUBLICATIONS

International Search Report for International Patent Application No. PCT/JP2012/052203, mailed May 29, 2012.
(Continued)

*Primary Examiner* — Chikaodili E Anyikire
(74) *Attorney, Agent, or Firm* — Shapiro, Gabor and Rosenberger, PLLC (57) ABSTRACT

A phase-contrast microscope system includes: an illumination optical system that illuminates a specimen with an illumination light from a light source; an imaging optical system that forms an image of the specimen from a light from the specimen; a first spatial modulation element that is disposed in a position of a pupil of the imaging optical system and changes an amplitude transmittance distribution of the light from the specimen; an image sensor that detects the image of the specimen by the imaging optical system and outputs a picture signal; a calculation section that calculates the amplitude transmittance distribution of the light from the specimen appropriate for observing the specimen on the basis of the output data detected by the image sensor and the amplitude transmittance distribution of the light from the specimen formed by the first spatial modulation element.

16 Claims, 9 Drawing Sheets

(56) References Cited

U.S. PATENT DOCUMENTS

| | | |
|---|---|---|
| 7,443,578 B2 | 10/2008 | Yamazaki et al. |
| 8,867,815 B2 | 10/2014 | Ikeda et al. |
| 2001/0045506 A1 | 11/2001 | Masuyama |
| 2003/0030902 A1* | 2/2003 | Fukushima et al. .......... 359/388 |
| 2007/0024966 A1 | 2/2007 | Yamazaki et al. |
| 2011/0229008 A1 | 9/2011 | Ikeda et al. |

FOREIGN PATENT DOCUMENTS

| | | |
|---|---|---|
| JP | A-2003-121749 | 4/2003 |
| JP | A-2004-361361 | 12/2004 |
| JP | A-2007-033790 | 2/2007 |
| JP | A-2007-199397 | 8/2007 |
| JP | A-2008-295084 | 12/2008 |
| JP | A-2008-299245 | 12/2008 |
| JP | A-2009-148224 | 7/2009 |
| JP | 2009-237109 A | 10/2009 |
| JP | A-2011-002514 | 1/2011 |

OTHER PUBLICATIONS

Written Opinion of the International Searching Authority for International Patent Application No. PCT/JP2012/052203, mailed May 29, 2012.

Office Action issued Feb. 28, 2015, in Chinese Patent Application No. 201280021356.2.

Office Action issued Jan. 19, 2015, in Japanese Patent Application No. 2011-111032.

Office Action issued Aug. 4, 2015, in Taiwanese Patent Application No. 101106457.

Office Action issued Dec. 14, 2015, in European Patent Application No. 12709393.8.

* cited by examiner

MICROSCOPE SYSTEM

CROSS-REFERENCE TO RELATED APPLICATION

This application is a non-provisional application claiming priority to and the benefit of U.S. Provisional Application No. 61/534,155, filed Sep. 13, 2011. In addition, priority is claimed on Japanese Patent Application No. 2011-111032, filed on May 18, 2011. The entire contents of which are incorporated herein by reference.

BACKGROUND

1. Field of the Invention

The present invention relates to a microscope system that derives and forms distribution of illumination light appropriate for observation by using phase-contrast.

2. Description of Related Art

In phase-contrast microscopes, a ring diaphragm and a phase ring form the intensity distribution of the illumination light.

Since the distribution of the illumination light has a great effect on an observational image of a specimen such as the phase ring have been subjected to tests to further improve the observation picture of the specimen. For example, in Japanese Unexamined Patent Application Publication No. 2009-237109 1, a modulation section is provided to surround a ring region which is formed in a ring shape of the phase ring, and is formed such that the direction of the transmission axis of the modulation section is different from that of a region other than the modulation section, thereby embodying a phase-contrast microscope capable of continuously changing the contrast.

SUMMARY

However, in the above-mentioned microscopes, the shape of the phase ring is fixed to some extent, and there is a limitation in adjustment of the distribution of the illumination light. Furthermore, even in a case of selecting the shape of the phase ring, the selection is performed on the basis of determination or experience of the observer, and thus the shape of the phase ring is not always formed to be able to observe the image of the object at its best condition during observation. Therefore, in the phase-contrast microscopes, it is difficult to freely select the shape and observe the image of the object at its best condition during the observation.

Accordingly, the present invention provides a microscope system that derives and forms an amplitude transmittance distribution of the light appropriate to observe the specimen.

A phase-contrast microscope system according to an aspect according to the present invention includes: an illumination optical system that illuminates a specimen with an illumination light from a light source; an imaging optical system that forms an image of the specimen from a light from the specimen; a first spatial modulation element that is disposed in a position of a pupil of the imaging optical system and changes an amplitude transmittance distribution of the light from the specimen; an image sensor that detects the image of the specimen by the imaging optical system and outputs a picture signal; a calculation section that calculates the amplitude transmittance distribution of the light from the specimen appropriate for observing the specimen on the basis of the output data detected by the image sensor and the amplitude transmittance distribution of the light from the specimen formed by the first spatial modulation element.

A program according to an aspect according to the present invention that observes a specimen is installed in a calculation section which is connected to the microscope, The microscope includes: an illumination optical system that illuminates the specimen with an illumination light from a light source; an imaging optical system that forms an image of the specimen from a light from the specimen; a first spatial modulation element that is disposed in a position of a pupil of the imaging optical system and changes the amplitude transmittance distribution of the light from the specimen; an image sensor that detects the image of the specimen by the imaging optical system and outputs a picture signal.

The program makes the calculation section execute a calculation of the amplitude transmittance distribution of the light from the specimen appropriate for observing the specimen on the basis of the output data detected by the image sensor and the amplitude transmittance distribution of the light from the specimen formed by the first spatial modulation element.

According to the aspects of the present invention, there is provided a microscope system that derives and forms the amplitude transmittance distribution of the light appropriate to observe an image of an object in good condition during the observation.

DESCRIPTION OF EMBODIMENTS

FIRST EXAMPLE

As a first example, a description will be given of a microscope system 100 which is automatically adjusted by deriving an intensity distribution of an illumination light and an amplitude transmittance distribution of a light. Especially, the microscope system 100 is suitable for the phase object which is such as water-clear cells that does not change intensity of the light and only changes the phase especially in a transmitted light.

<Microscope System 100>

Figure 1:
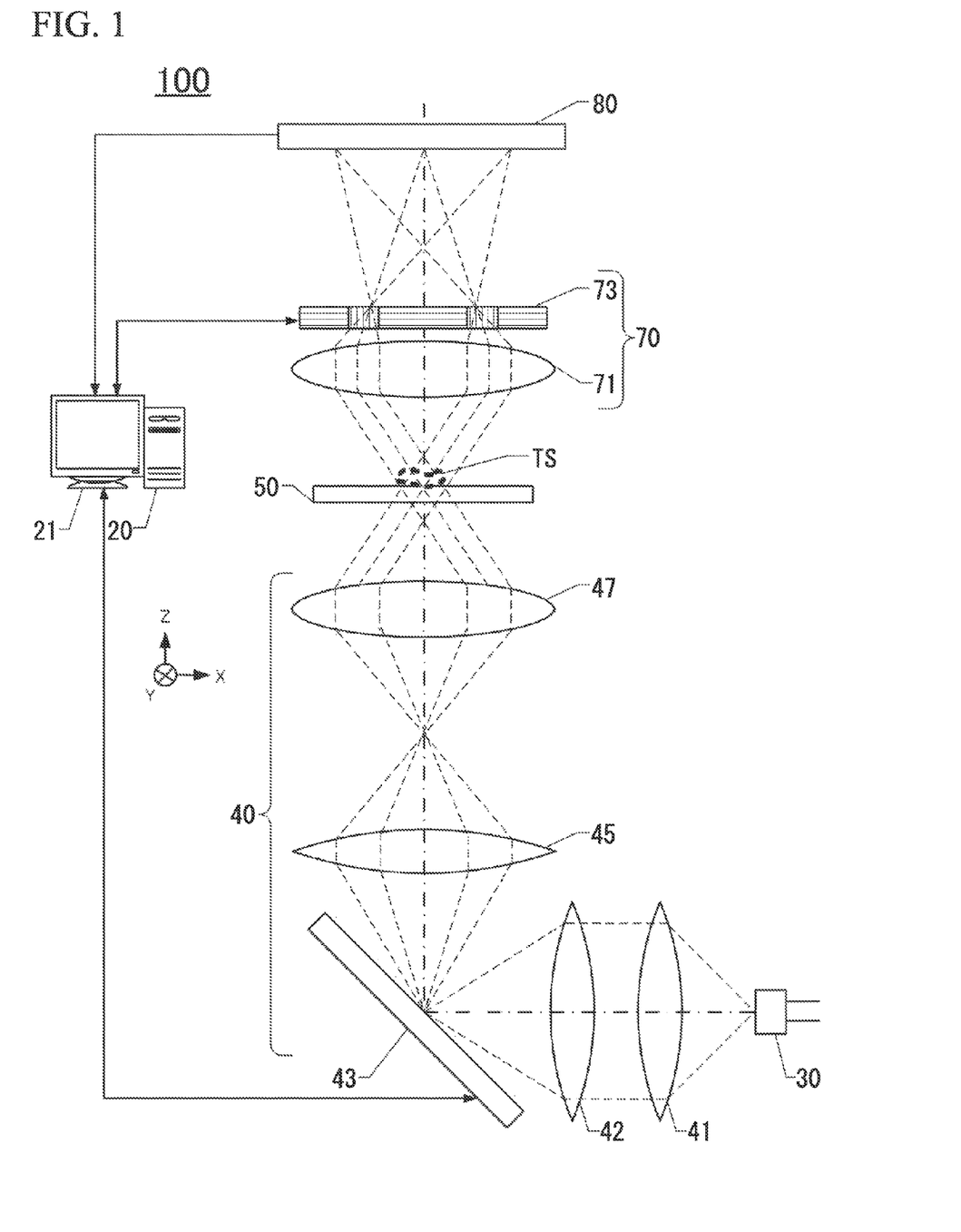
FIG. 1 is a schematic configuration diagram of a microscope system.

FIG. 1 is a schematic configuration diagram of the microscope system 100. The microscope system 100 includes a microscope that mainly includes: an illumination light source 30; an illumination optical system 40; a stage 50; an imaging optical system 70 and an image sensor 80. Furthermore, the microscope system 100 includes a calculation section 20 such as a computer. Hereinafter, the center axis of rays emitted from the illumination light source 30 is set as the Z axis direction, and the directions, which are perpendicular to the Z axis and are orthogonal to each other, are set as the X axis direction and the Y axis direction.

The illumination light source 30 is a light source that emits illumination such as white illumination light to a specimen TS. In the present example, a light source where red, green and blue LEDs are combined is used as the illumination light source 30. Although not specifically discussed, white LED or halogen lamp may be used as the light source. The illumination optical system 40 includes a collimator lens 41, a first condenser lens 42, a DMD (Digital Micromirror Device) 43, a second condenser lens 45 and a third condenser lens 47.

A second spatial modulation element which is the DMD 43 is disposed, for example, in a position which is conjugate to the illumination light source 30. The DMD 43 is disposed in the position which is also conjugate to a position of a pupil of the imaging optical system 70 inside the illumination optical system 40. The DMD 43 can change an intensity distribution of the illumination light in the conjugate position of the pupil of the imaging optical system 70. In a surface of the DMD 43, a plurality of small movable reflection mirrors (not shown in the drawing) are formed by aggregating and each mirror can independently move. The DMD 43 can form two-dimensional spatial distribution of the illumination light into a random shape and size with respect to the specimen TS by moving the movable reflection mirrors.

The specimen TS which includes undetermined structures such as cell tissues is placed in the stage 50 and the stage 50 is movable in the XY axis direction to move to the position of the specimen TS to be observed. In addition, the stage 50 is movable in also the Z axis direction to adjust the focus of the specimen TS.

The imaging optical system 70 includes a liquid crystal element 73 which is an objective lens 71 and is a first spatial modulation element. Furthermore, the imaging optical system 70 forms an image of a transmitted light or a reflected light of the specimen TS to the image sensor 80.

The liquid crystal element 73 is disposed in the position of the pupil of the imaging optical system 70 or close thereto. The liquid crystal element 73 is configured which can freely change the phase of the light and the transmittance of the light, and is configured which can change the two-dimensional spatial distribution based on the phase and the transmittance, too.

The calculation section 20 receives the output data detected by the image sensor 80 and allows to display on the display section 21 such as a monitor. Furthermore, the calculation section 20 analyzes the output data and calculates the intensity distribution of the illumination light and the amplitude transmittance distribution of the light from the specimen appropriate for observation of the specimen TS.

In FIG. 1, the light emitted from the illumination light source 30 is shown by dotted lines. The illumination light emitted from the illumination light source 30 is collimated by the collimator lens 41, is converged by the first condenser lens 42 and is incident to DMD 43. In DMD 43, some of the movable reflection mirrors reflects the incident light to the second condenser lens 45 side. In addition, the rests of the reflection mirrors do not reflect the incident light to the second condenser lens 45 side.

Figure 2A:
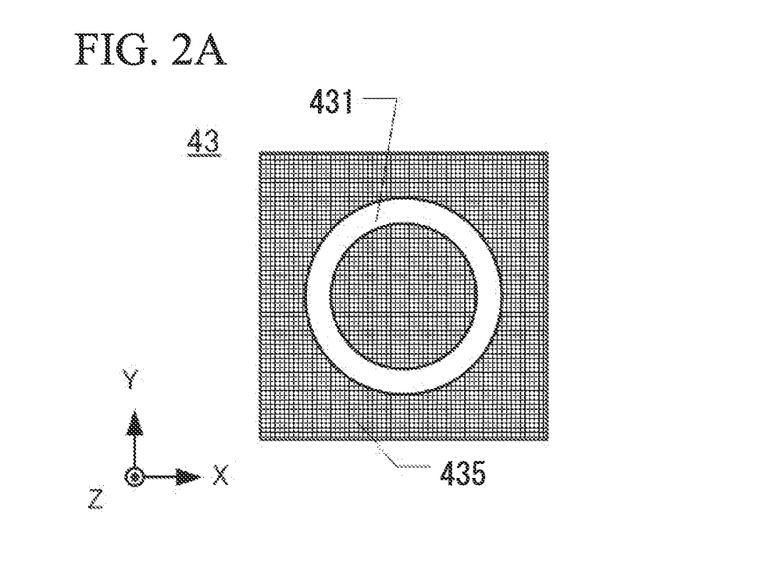
FIG. 2A is a diagram where an illumination region and a light blocking region of a DMD are formed.

For example, FIG. 2A is a plan view of the DMD 43. For example, the DMD 43 changes the angle of the reflection mirrors corresponding to the ring shape and reflects the incident light. Then, the illumination region 431 is formed. In addition, the regions of the reflection mirrors, of which the angles are not changed, are a light blocking region 435. In this manner, the intensity distribution of the illumination light can be changed by changing the angle of the minute reflection mirrors.

The illumination light reflected by the DMD 43 passes to the specimen TS through the second condenser lens 45 and the third condenser lens 47. The light passed through the specimen TS transmits the objective lens 71 and is incident to the liquid crystal element 73. The light which has been incident to the liquid crystal element 73 is imaged on the image sensor 80 with the change of the phase of a part of the light.

Figure 2B:
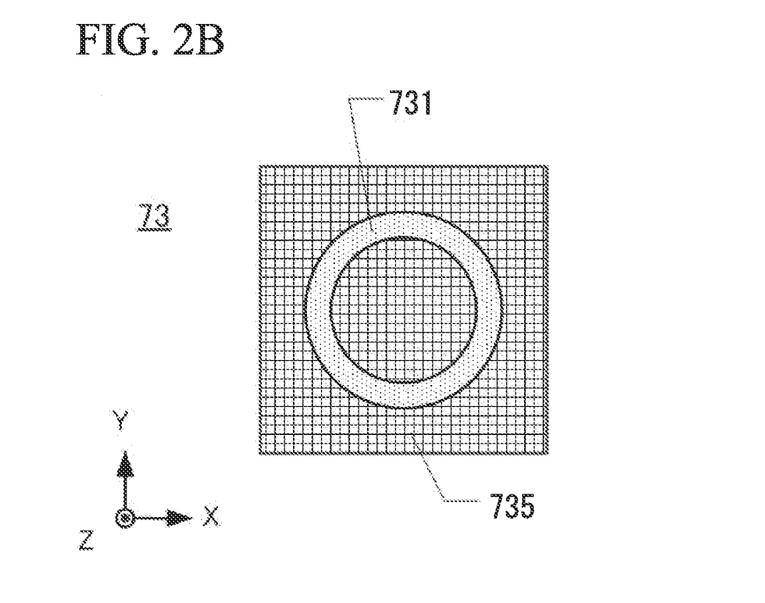
FIG. 2B is a diagram where a phase modulation region and a diffracted light transmission region of a liquid crystal element are formed.

FIG. 2B is a plan view of the liquid crystal element 73. For example, the phase modulation region may be formed into the ring shape on the liquid crystal element 73. The phase of the light which transmits through this phase modulation region 731 advances or delays at one quarter wavelength thereof. The phase of the light which transmits through a diffracted light transmission region 735, where is a region other than the phase modulation region 731, stays still. The phase modulation region 731 is formed to be conjugate to the illumination region 431 of the DMD 43. The liquid crystal element 73 can freely change the two-dimensional spatial distribution of the phase modulation region 731.

A zero-order light (a transmitted light) of the microscope system 100 is reflected by the DMD 43 and the illumination light of the illumination region 431 is illuminated to the specimen TS, the light transmitted through the specimen TS transmits through the phase modulation region 731 of the liquid crystal element 73 and reaches the image sensor 80. Furthermore, the diffracted light emitted from the specimen TS transmits through the diffracted light transmission region 735 of the liquid crystal element 73 and reaches the image sensor 80. Then, the zero-order light and the diffracted light form images on the image sensor 80. Since the light intensity of the zero-order light is generally stronger than the diffracted light, it is preferable that there is a function that adjusts the transmittance of the light passing through the phase modulation region 731. Hereinafter, unless specifically limited, the change of the amplitude transmittance distribution of the light from the specimen TS means the change of the two-dimensional spatial distribution of the phase modulation region 731 and the change of the transmittance.

As shown in FIG. 1, the output data of the picture imaged on the image sensor 80 is sent to the calculation section 20. In the calculation section 20, the intensity distribution of the illumination light and the amplitude transmittance distribution of the light appropriate for observation of the specimen TS are calculated on the basis of the output data of the picture obtained from the image sensor 80, the shape data of an aperture 431 formed by the DMD 43 and the shape data of the liquid crystal element 73. Then, the shape data, or the like for making the calculated intensity distribution and amplitude transmittance distribution of the illumination light appropriate for observation of the specimen TS is sent to the DMD 43 and the liquid crystal element 73.

When the illumination shape appropriate for observation of the specimen TS is sent to the DMD 43, the DMD 43 changes the size and the shape of the illumination region 431. Similarly, the liquid crystal element 73 can freely change the size and the shape of the phase modulation region 731. For example, if the diameter of the illumination region 431 of the DMD 43 is increased, the numerical aperture of the transmitted light is increased, thus the resolution may be increased. Since the phase modulation region 731 of the liquid crystal element 73 is conjugate to the illumination region 431 of the DMD 43, the phase modulation region 731 may change the intensity distribution of the illumination light. In addition, it is preferable that the shape and the size of the illumination region 431 and the phase modulation region 731 are synchronously changed.

<Microscope System 200>

Figure 3:
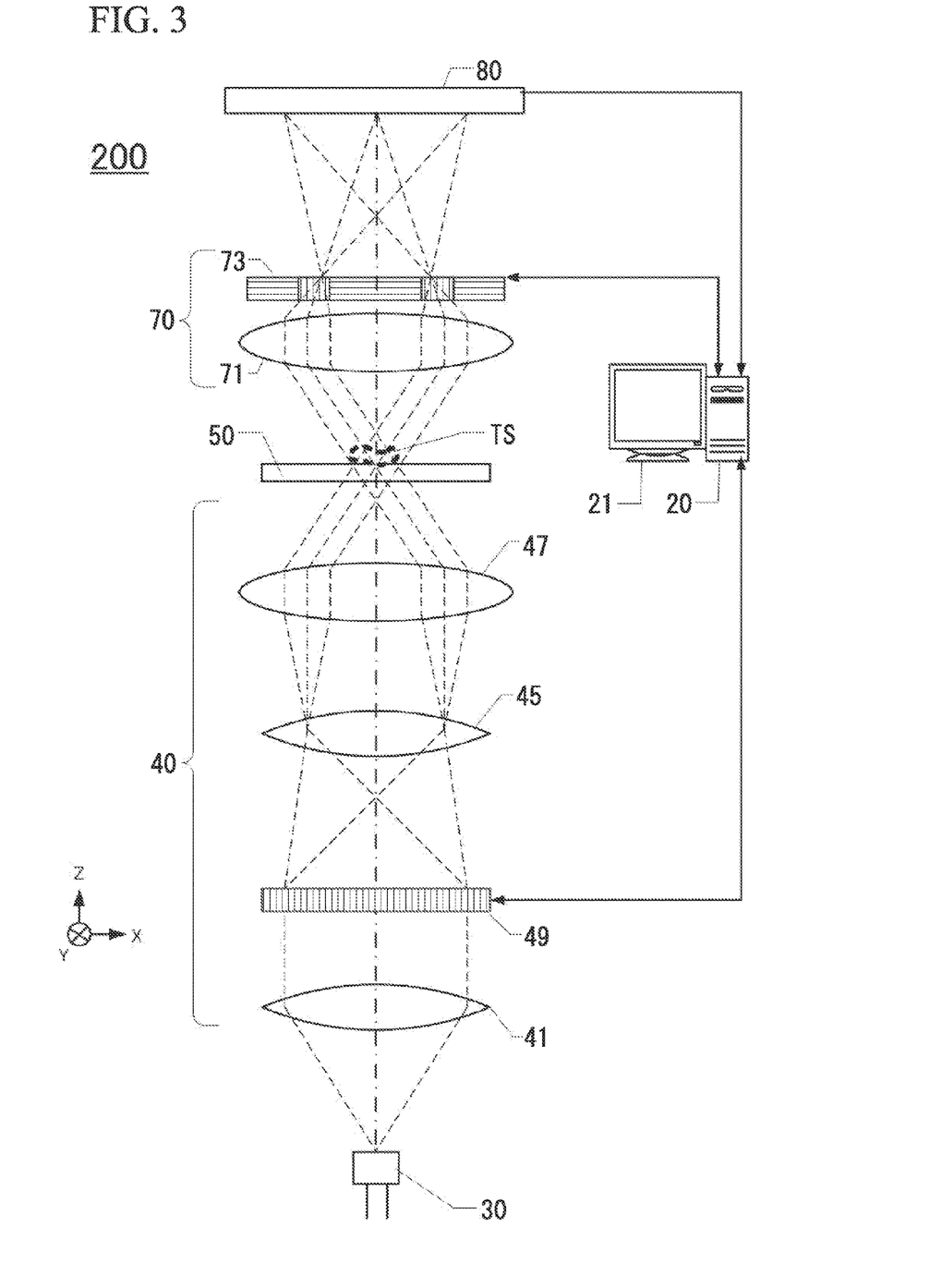
FIG. 3 is a schematic configuration diagram of the microscope system.

FIG. 3 is a schematic configuration diagram of a microscope system 200. The microscope system 200 is configured to be substantially the same as the microscope system 100, a configuration of the illumination optical system 40 thereof is different from the configuration of the microscope system 100.

The illumination optical system 40 of the microscope system 200 includes the collimator lens 41, the changeable diffraction grating 49, the second condenser lens 45 and the third condenser lens 47.

The changeable diffraction grating 49 which is the second spatial modulation element is configured from, for example, two diffractive elements. Then, the changeable diffraction grating 49 changes a diffraction angle of the light by changing a distance in the Z axis direction or a relative position in the XY axis directions in a space between the two diffractive elements. In addition, the changeable diffraction grating 49 is disposed in a position which is also conjugate to the position of the pupil of the imaging optical system 70 in the illumination optical system 40. Then, the changeable diffraction grating 49 can change the intensity distribution of the illumination light in the conjugate position of the pupil of the imaging optical system 70.

The illumination light from the illumination light source 30 is collimated by the collimator lens 41, the collimated light is incident to the changeable diffraction grating 49. Then, the changeable diffraction grating 49 can illuminate the ring shape illumination light as shown in FIG. 2A. The changeable diffraction grating 49 can form the illumination light into a random shape and the size with respect to the specimen TS by moving two diffractive elements.

The changeable diffraction grating 49 which is the second spatial modulation element can change the illumination light from the illumination light source 30 into a random shape or the size without wasting. For this reason, the light amount of the illumination light source 30 may not be larger than necessary. On the other hand, since the DMD 43 does not orient a part of the illumination light toward the specimen TS as shown in the microscope system 100, there is a case of wasting the light from the illumination light source 30.

Similar to the microscope system 100, the light passed through the specimen TS transmits through the objective lens 71 and is incident to the liquid crystal element 73. The light which has been incident to the liquid crystal element 73 is imaged on the image sensor 80 with the change of the phase of a part of the light.

<<Deriving Method of Intensity Distribution of Illumination Light and Amplitude Transmittance Distribution of Light>>

A calculating method for finding the intensity distribution of the illumination light appropriate for observation of the specimen TS or the amplitude transmittance distribution of the light from the specimen will be described below. As the calculation method, there are several methods such as simulated annealing and Tabu search. Hereinafter, two methods, the hill climbing method (maximum grade method) and a method using genetic algorithms, will be described.

<Hill Climbing Method>

Figure 4:
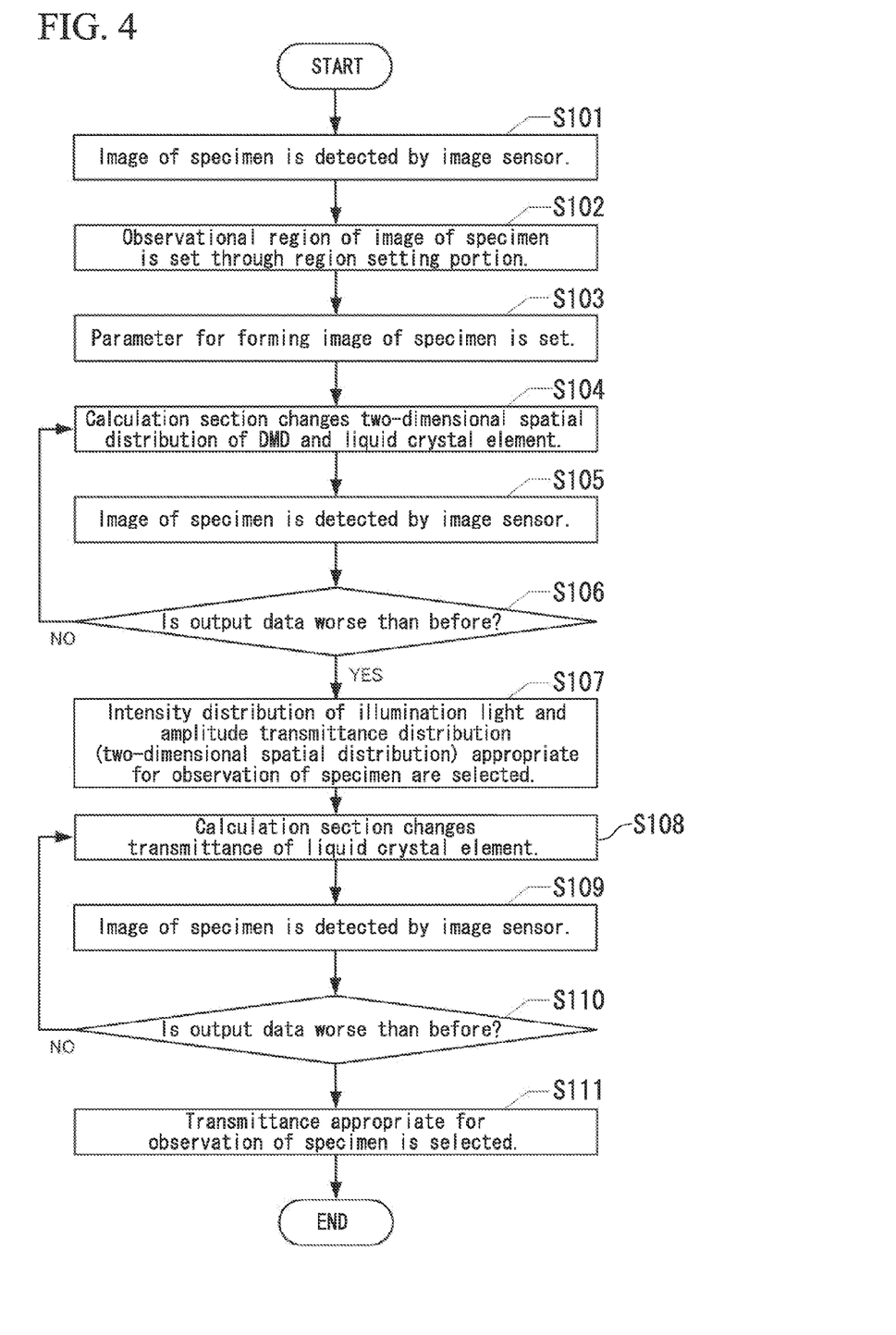
FIG. 4 is a flowchart that finds an amplitude transmittance distribution of the light from a specimen appropriate for observation by using a hill climbing method.

The hill climbing method is a method of incrementally changing the intensity distribution of the illumination light and the amplitude transmittance distribution of the light which are initially set and acquiring picture output data for each change so as to thereby find a condition in which the output data is most approximate to the condition set by an observer. Referring to FIG. 4, the description will be given below.

FIG. 4 is a flowchart of the hill climbing method that finds the intensity distribution of the illumination light and the amplitude transmittance distribution of the light appropriate for observation by incrementally changing the intensity distribution of the illumination light and the amplitude transmittance distribution of the light with use of the DMD 43 the liquid crystal element 73. In step S101, first, the illumination region 431 of the DMD 43 is set to the size and the shape in an initial configuration. In addition, the phase modulation region 731 of the liquid crystal element 73 is also set to the two-dimensional spatial distribution (the size and the shape) in the initial configuration. Furthermore, the transmittance of the phase modulation region 731 of the liquid crystal element 73 is also set to the initial configuration.

Figure 6A:
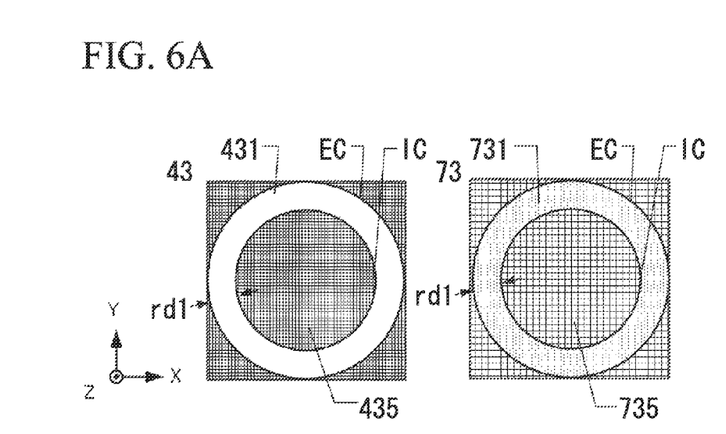
FIGS. 6A to 6C is diagrams showing the changing of the illumination region and the phase modulation region.

For example, the illumination region 431 in the initial configuration is a wide ring shape and the ring outer circle thereof is maximum diameter (referring to FIG. 6A). In this state, the image of the specimen TS is detected by the image sensor 80. The detection of the image of the specimen TS is intended to acquire a reference picture before adjusting the shape and the size of the illumination region 431 and the phase modulation region 731. The picture output data of the specimen TS detected by the image sensor 80 is sent to the calculation section 20 and the picture of the specimen TS is displayed on the display section 21 such as a monitor connected to the calculation section 20.

Figure 5:
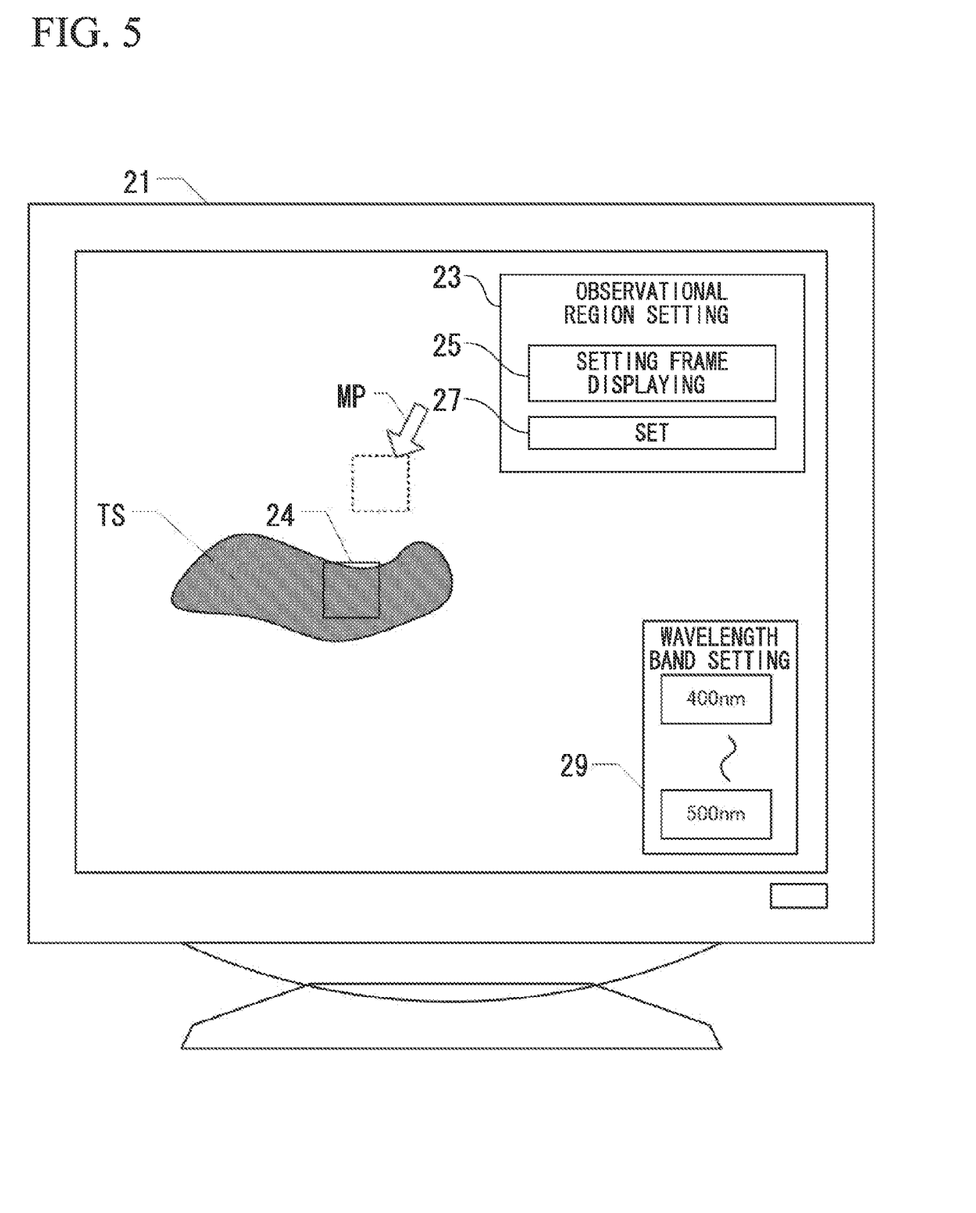
FIG. 5 is a diagram of a region setting portion and a wavelength band setting portion shown in a display section.

In step S102, the observational region is set on the image of the specimen TS by a region setting portion 23 (referring to FIG. 5) displayed on the display section 21. FIG. 5 is a diagram of the region setting portion 23 and a wavelength band setting portion 29. FIG. 5 shows a state where the picture of the specimen TS is displayed on the display section 21. In the display section 21, the region setting portion 23 is displayed in the circumference of the display section 21. When a setting frame display button 25 in the region setting portion 23 is clicked with a mouse pointer MP, the setting frame display button 25 displays the observational region frame 24 on the display section 21. Then, the observer moves the displayed observational region frame 24 to the position of the specimen TS to be observed with use of the mouse pointer MP. Then, the observer clicks a setting button 27. Thus, the observational region to be especially observed by the observer is set.

In FIG. 5, the observational region frame 24 drawn with the dotted line shows an example of being displayed upon the click of the setting frame display button 25 and the observational region frame 24 drawn with the solid line shows the state where the setting button 27 has been clicked. In FIG. 5, one observational region 24 is set, however, two or more observational regions 24 may be set at once. In addition, the entire image of the specimen TS may be set by enlarging the observational region frame 24 with the mouse pointer MP.

In addition, when the observer does not want to set the observational region 24, step S102 may be skipped. In this case, the entire image of the specimen TS detected by the image sensor 80 is set as the observational region 24. In addition, the observer moves the region of the specimen TS to be observed to the center, so the center region of the image sensor 80 may be automatically selected as a part of the region.

Returning to FIG. 4, in step S103, a wavelength band is set as one parameter for forming the observational image of the specimen TS with the wavelength band setting portion 29

(referring to FIG. 5). As shown in FIG. 5, in the wavelength band setting portion, the wavelength band of the light which is to be used or to be observed by the observer can be set. For example, if the wavelength appropriate for observation of the specimen TS is estimated, that wavelength can be set with the wavelength band setting portion 29. As shown in FIG. 5, the setting of the wavelength band may be performed by inputting numerical values by the observer and may be performed by selecting the wavelength band desired by the observer from among a plurality of options such as red, green, blue, or the like. The illumination light source 30 is the combination of red, green and blue LEDs, thus, if red is selected, the illumination light source 30 may irradiate only red light.

Returning to FIG. 4, in step S104, the calculation section 20 changes the size and the shape of the illumination region 431 of the DMD 43 and the phase modulation region 731 of the liquid crystal element 73. The calculation section 20 slightly changes the size of the illumination region 431 and the phase modulation region 731 in the initial configuration value set in step S101. That is, the region of the illumination light and the region of the additional phase are slightly changed.

Figure 6B:
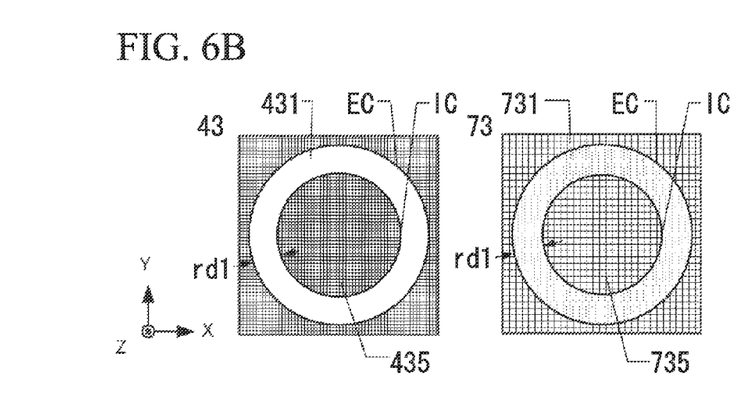
Figure 6C:
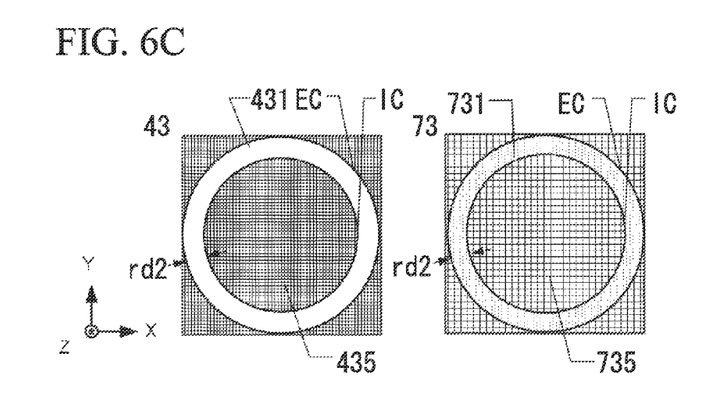

Referring to FIGS. 6A to 6C, the change of the intensity distribution of the illumination region 431 and the phase modulation region 731 will be described. FIG. 6A is a schematic plan view of the DMD 43 and the liquid crystal element 73 in an initial state. In FIG. 6A, a ring outer circle EC which is the illumination region 431 is maximum diameter and a ring width rd1 which is the difference between the ring outer circle EC and a ring inner circle IC is wide. It is similarly applied to the phase modulation region 731. In FIG. 6B, the ring outer circle EC which is the illumination region 431 is maximum diameter and the ring width rd1 which is the difference between the ring outer circle EC and the ring inner circle IC is wide.

FIG. 6B is an example that the diameter of the ring inner circle IC and the diameter of the ring outer circle EC are decreased from the initial state of FIG. 6A during maintaining the ring width rd1 constant. In this manner, the region of the illumination light and the region of the additional phase are slightly changed. FIG. 6C is an example that the diameter of the ring inner circle IC is increased from the initial state of FIG. 6A during maintaining the diameter of the ring outer circle EC constant and the ring width rd2 is decreased. In this manner, the intensity distribution of the illumination light and the region of the additional phase are slightly changed. Although not shown, the diameter of the ring outer circle IC may be decreased during maintaining the diameter of the ring inner circle IC constant or both of the diameter of the ring inner circle IC and the diameter of the ring outer circle EC may be decreased while decreasing the ring width rd1.

Returning to FIG. 4, in step S105, the image of the specimen TS is detected by the image sensor 80. For example, under the condition of the illumination region 431 and the phase modulation region 731 shown in FIG. 6B, the image of the specimen TS is detected by the image sensor 80 and the output data is sent to the calculation section 20.

In step S106, whether the output data currently sent to the calculation section 20 is better or worse than the previous the output data is determined. For example, it is assumed that the observational region 24 have been set by the region setting portion 23 of the display section 21 shown in FIG. 5. Supposing the better condition means that the contrast of the image of the observational region 24 of the image of this specimen TS is increased, whether the calculated contrast on the basis of the output data currently obtained (for example, the illumination region 431 and the phase modulation region 731 shown in FIG. 6B) is better or worse than the calculated contrast on the basis of the output data previously obtained (for example, the illumination region 431 and the phase modulation region 731 shown in FIG. 6C) is compared. If it is better, the step returns to step S104, the illumination region 431 and the phase modulation region 731 are further changed and the output data thereof (step S105) is detected. That is, since the contrast of the image of the observational region 24 is increased, the step returns to step S104 and the illumination region 431 and the phase modulation region 731 are further changed. On the other hand, if the current contrast is worse than before, the previous illumination region 431 and the previous phase modulation region 731 have the highest contrast. Then, the step goes to the next step S107.

In step S107, the illumination region 431 and the phase modulation region 731 appropriate for observation of the specimen TS are selected. That is, the two-dimensional spatial distribution of the illumination region 431 and the phase modulation region 731, which are used just before the contrast of the observational region 24 gets worse, is a two-dimensional spatial distribution appropriate for observation of the specimen TS.

In step S108, the transmittance of the phase modulation region 731 is slightly changed with the illumination region 431 and the phase modulation region 731 of the two-dimensional spatial distribution identified in step S107. For example, the transmittance of the phase modulation region 731 of 90% is changed to 80%.

In step S109, the image of the specimen TS is detected by the image sensor 80. Then, the output data of the image of the specimen TS detect by the image sensor 80 is sent to the calculation section 20.

In step S110, whether the output data sent to the calculation section 20 is better or worse than the previous output data is determined. Specifically, whether the contrast of picture currently sent to the calculation section 20 is better or worse than the contrast of the previous picture is determined. If the contrast of the image of the observational region 24 is increased, the step returns to step S108 and the transmittance of the phase modulation region 731 is further changed. On the other hand, if the current contrast is worse than before, the previous illumination region 431 and the previous phase modulation region 731 have the highest contrast. Then, the step goes to the next step S111.

In step S111, the transmittance of the phase modulation region 731 of the specimen TS is selected. That is, the transmittance of the phase modulation region 731, which is used just before the contrast of the observational region 24 gets worse, is a transmittance appropriate for observation of the specimen TS.

In step S104 of the above flowchart, the size of the illumination region 431 and the phase modulation region 731 is changed in a similar shape. However, not only the change into a similar shape, but also a change of the shape itself may be performed. For example, the circular ring shape may be incrementally formed to be finally into the elliptical ring shape.

<Method Using Genetic Algorithm>

Figure 7:
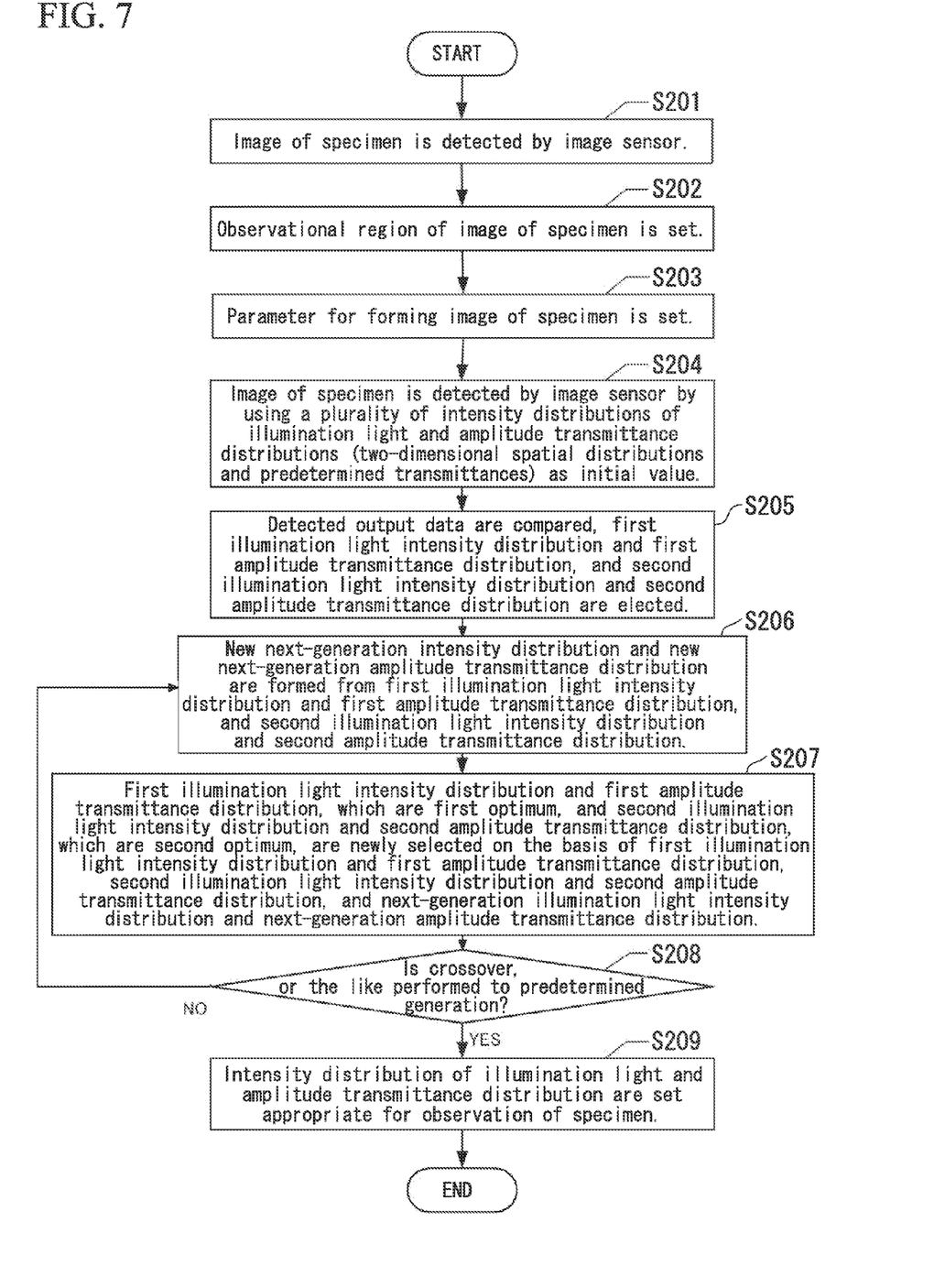
FIG. 7 is a genetic algorithm flowchart.

Next, a method using the genetic algorithm will be described. The genetic algorithm is a method of finding an illumination shape by acquiring the picture data pieces, which are respectively associated with a plurality of the intensity distributions of the illumination light and the amplitude transmittance distributions of the light provided in advance, and by combining of the amplitude transmittance distributions appropriate for the observation of the specimen 60.

FIG. 7 is a flowchart in which the genetic algorithm is used. In step S201, first, the illumination region 431 of the DMD 43 and the phase modulation region 731 of the liquid crystal element 73 is set to the size and the shape in the initial configuration. For example, the illumination region 431 and the phase modulation region 731 in the initial configuration are the wide ring shapes showing in FIG. 6A and the ring outer circles thereof have the greatest diameter. In this state, the image of the specimen TS is detected by the image sensor 80. Furthermore, the transmittance of the phase modulation region 731 is also set to a predetermined initial value.

In step S202, the observational region 24 of the specimen TS is set by the region setting portion 23. By step S201, the image of the specimen TS is displayed on the display section 21. The region setting portion 23 may be a part of the specimen TS or the entire specimen TS as shown in FIG. 5. The observer moves the region of the specimen TS to be observed to the center, thus the center region of the image sensor 80 may be automatically selected as a part of the region.

In step S203, the parameter for forming the image of the specimen TS is set. The observer can set the parameter for inputting the observation condition relevant to the image of the specimen TS which the observer requests and allows. The parameter is such as the wavelength band of the specimen TS shown in FIG. 5.

In step S204, the image of the specimen TS is detected with the image sensor 80 by using two or more intensity distributions and amplitude transmittance distributions of the illumination light as the initial value. Then, the calculation section 20 acquires all of the output data of the pictures of the images where the specimen TS is measured by using the plurality of the intensity distributions and the amplitude transmittance distributions of the illumination light.

Figure 8:
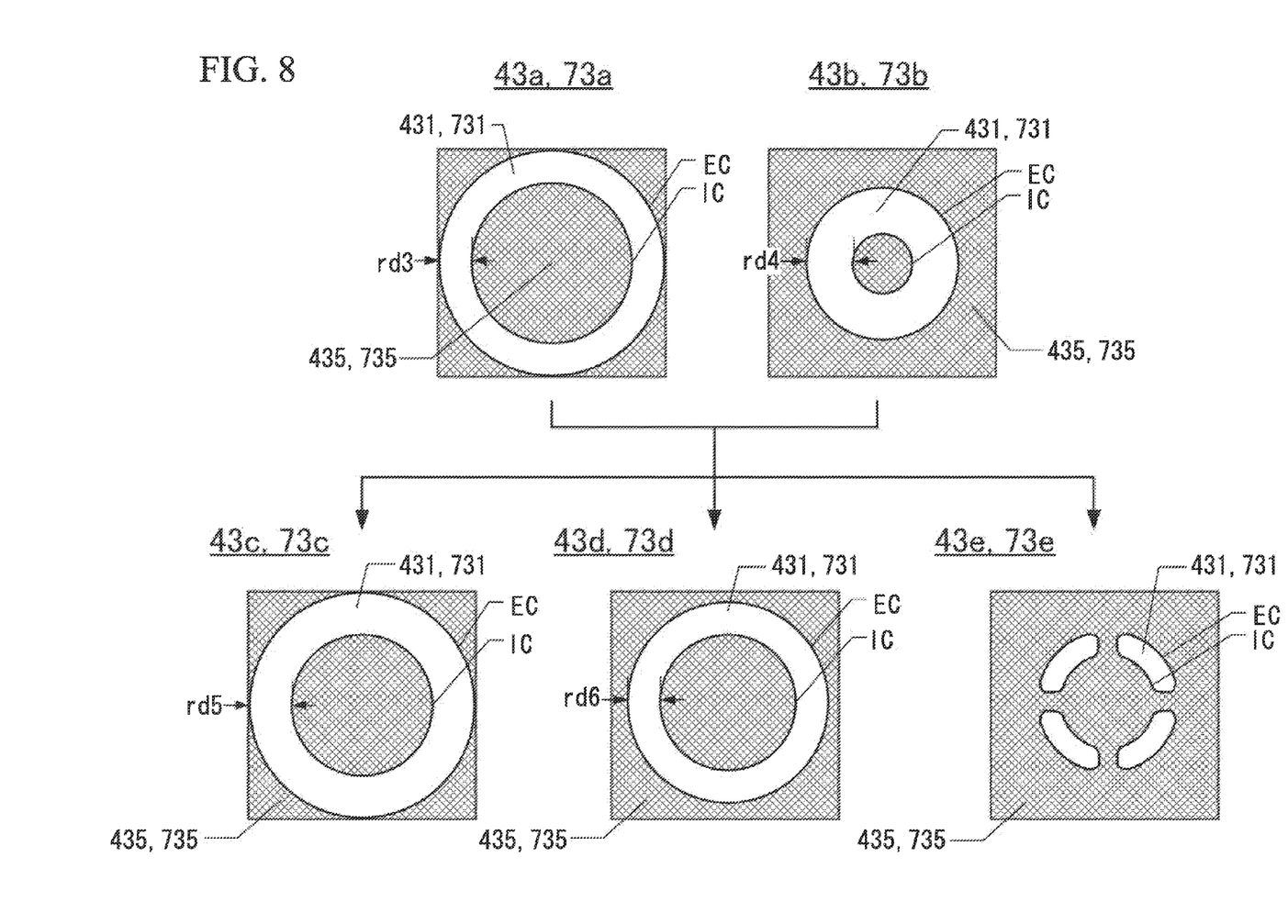
FIG. 8 is a diagram showing examples of the illumination region and the phase modulation region.

In step S205, each the output data of the pictures of the specimen TS acquired in step S204 are compared. Supposing the better condition means that the contrast of the observational region 24 of the image of the specimen TS is increased, the illumination region 431 and the phase modulation region 731 which make the best contrast, and the illumination region 431 and the phase modulation region 731 which make the second best contrast, are selected among the contrasts calculated on the basis of the currently obtained output data. Two of the illumination region 431 and the phase modulation region 731 which have the better contrast are called as a first illumination light intensity distribution and a first amplitude transmittance distribution, a second illumination light intensity distribution and a second amplitude transmittance distribution. Referring to FIG. 8, an example of two pairs of the intensity distribution and the amplitude transmittance distribution of illumination light will be described.

FIG. 8 shows a diagram of various illumination shapes of the DMD 43 and the liquid crystal element 73. In FIG. 8, the white parts correspond to the illumination region 431 and the phase modulation region 731, the hatched regions correspond to the light blocking region 435 and the diffracted light transmission region 735.

As shown in FIG. 8, for example, the first illumination light the intensity distribution and the first amplitude transmittance distribution are the illumination region 431 and the phase modulation region 731 shown in the DMD 43a and the liquid crystal element 73a. The illumination region 431 and the phase modulation region 731 are formed so that the ring outer circle EC has the greatest diameter and the ring width is rd3. The second illumination light the intensity distribution and the second amplitude transmittance distribution are the illumination region 431 and the phase modulation region 731 shown in the DMD 43b and the liquid crystal element 73b. The illumination region 431 and the phase modulation region 731 are formed so that the ring outer circle EC is smaller and the ring width is rd4.

Returning to FIG. 7, in step S206, the calculation section 20 forms illumination shapes, which have next-generation intensity distributions of the illumination light, from the first illumination intensity distribution and first amplitude transmittance distribution, and the second illumination intensity distribution and second amplitude transmittance distribution in accordance with a method of crossover or mutation of the genetic algorithm. Referring to FIG. 8, a description will be given of an example in which the illumination shapes having the next-generation intensity distributions of the illumination light are formed.

In step S205, the illumination region 431 and the phase modulation region 731 shown in the DMD 43a and the liquid crystal element 73a, and the illumination region 431 and the phase modulation region 731 shown in the DMD 43b and the liquid crystal element 73b are selected. For example, the calculation section 20 performs the operation of crossover (the combination) or mutation of the two pairs of the illumination region 431 and the phase modulation region 731, thus the illumination region 431 and the phase modulation region 731 shown in the DMD 43c and the liquid crystal element 73c, the DMD 43d and the liquid crystal element 73d, and the DMD 43e and the liquid crystal element 73e are formed.

The DMD 43c and the liquid crystal element 73c is that the ring outer circle EC has the greatest diameter and the ring width is rd5 larger than the ring width rd3. The DMD 43d and the liquid crystal element 73d has the ring outer circle EC, the ring inner circle IC and the ring width rd6 which are the averages of the illumination regions 431 and the phase modulation regions 731 of the DMD 43a and the liquid crystal element 73a and the DMD 43b and the liquid crystal element 73b. The DMD 43e and the liquid crystal element 73e are the illumination region 431 and the phase modulation region 73 where the ring is divided into four.

FIG. 8 shows just examples of the combinations. In practice, the shape of the DMD 43 and the liquid crystal element 73 is randomly formed, thus the newly formed shapes of the illumination region 431 and the phase modulation region 731 are extremely-numerous. Furthermore, especially, when the transmittance of the phase modulation region 73 is changed by other than the two-dimensional spatial distribution of the size and the shape, there are the innumerable combinations.

Returning to FIGS. 6A to 6C, in step S207, each the output data of the pictures of the specimen TS are detected by the image sensor 80 on the basis of the first illumination intensity distribution and the first amplitude transmittance distribution, the second illumination intensity distribution and the second amplitude transmittance distribution, and the next-generation illumination light intensity distribution and the next-generation amplitude transmittance distribution. Then, the calculation section 20 compares the contrasts on the basis of these output data. Then, the first illumination intensity distribution, which is most appropriate for the observation of the specimen TS, and the second illumination intensity distribution, which is secondarily appropriate therefor, are newly selected.

In step S208, it is determined whether crossover or mutation is performed up to a predetermined generation, for example, 1000 generations. If crossover or the like is not performed up to the predetermined generation, the procedure returns to step S206, and the illumination intensity distribution and the amplitude transmittance distribution further appropriate for the observation of the specimen are searched. If crossover or the like is performed up to the predetermined generation, the procedure advances to step S209.

In step S209, the illumination shape and the amplitude transmittance distribution of the best contrast generation are selected from the illumination regions 431 and the phase modulation regions 731 obtained by such the crossover to the predetermined generation, for example, 1000 generations. Thereafter, the illumination region 431 and the phase modulation region 731 of the illumination shape and the amplitude transmittance distribution of the generation is used for the observation of the specimen TS.

The calculating methods of the hill climbing method (the maximum grade method), the genetic algorithm shown in FIG. 4, FIG. 7 may be stored in a storage media as a program. Then, the program stored in this storage media is installed to the calculation section 20, thus this calculation section 20 can calculate the intensity distribution of the illumination light and the amplitude transmittance distribution of the light appropriate for observation of the specimen.

Furthermore, in step S106 or step S110 of FIG. 4, in step S205 or step S207 of FIG. 7, the calculation section 20 compares the contrasts of the image of the specimen TS. However, not only the contrast of the image of the specimen TS, but also an evaluation function or a maximum amount of tilt using the spatial frequency component may be used for the comparison. The maximum amount of tilt is maximum value of the change of the intensity value in a spatial intensity value profile (traverse axis: for example, the position in the X direction, longitudinal axis: the intensity value). The evaluation function will be described using FIG. 9.

Figure 9:
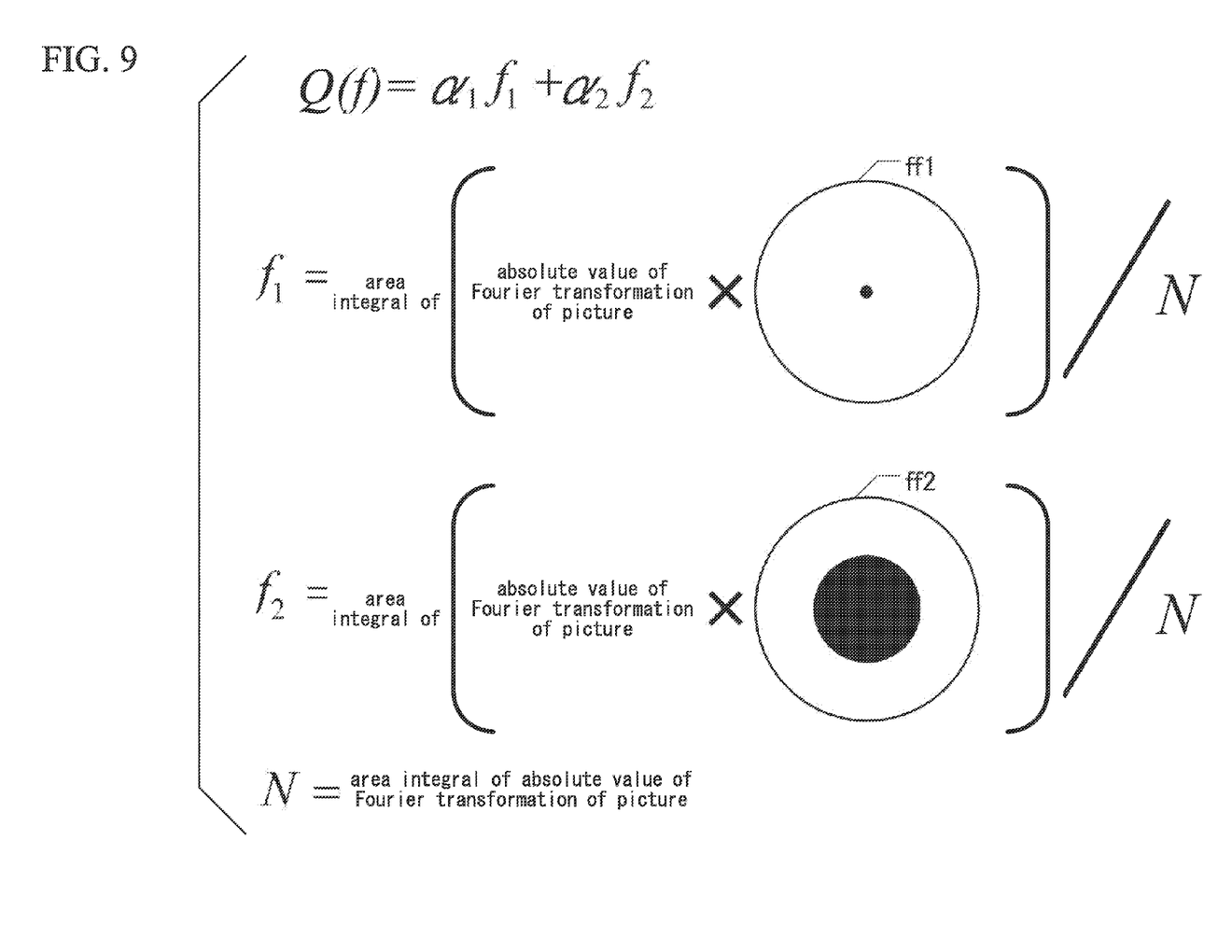
FIG. 9 is a conceptual diagram of an evaluation function $Q(f)$.

FIG. 9 is an example of the evaluation function Q(f). The evaluation function Q(f) is a formula, which includes a Fourier transformation value of picture, and is exemplified below.

$$Q(f) = \alpha_1 \times f_1 + \alpha_2 \times f_2$$

Here, $\alpha_1$, $\alpha_2$ are coefficients and $f_1$, $f_2$ are variables (functions).

For example, the variables $f_1$, $f_2$ are variables where values which are obtained by multiplying filters ff (ff1, ff2) to the Fourier transformation value FT of picture of the specimen are standardized. Fourier transformation value FT as a picture feature quantity may be an absolute value of a spatial frequency component calculated with Fourier transformation or a value where the spatial frequency component calculated with Fourier transformation is squared. FIG. 9 shows the variables $f_1$, $f_2$ using the absolute values of Fourier transformation.

The filters ff (ff1, ff2) are filters that remove DC component or low-frequency component of picture. FIG. 9 schematically shows those filters ff. Here, the black region represents to remove the picture component. The filter ff1 removes DC component of the picture signal of the specimen TS and the filter ff2 removes DC component and low-frequency component of the picture signal of the specimen TS. The filter ff1 is different from the filter ff2 how much the high-frequency component of the picture signal is emphasized. Different filters ff may be used as well as the filters ff shown in FIG. 9.

The variables $f_1$, $f_2$ are values where area integrals of values obtained by multiplying the Fourier transformation values FT as the picture feature quantity by the filters ff are divided by an area integral N of the Fourier transformation value FT. Therefore, the variables $f_1$, $f_2$ are standardized. The evaluation function Q(f) multiplies the variables $f_1$, $f_2$ by the coefficients $\alpha_1$, $\alpha_2$. For example, the coefficient $\alpha_1$ is equal to 1 and the coefficient $\alpha_2$ is equal to 2.

The calculation section 20 receives the picture signal from the image sensor 80. Then, the calculation section 20 applies the Fourier transformation to the picture signal from the image sensor 80. Then, the calculation section 20 calculates the Fourier transformation value (the spatial frequency component) of the specimen TS. Then, the calculation section 20 calculates evaluations relevant to the picture of the specimen TS with numerical value by using the Fourier transformation value of the specimen TS and the evaluation function Q(f).

The best modes for carrying out the invention have hitherto been described, but it will be readily apparent to those skilled in the art that various modifications can be applied to the examples without departing from the technical scope of the invention.

What is claimed is:

1. A phase-contrast microscope system that observes a specimen comprising:
   an illumination optical system that illuminates the specimen with an illumination light from a light source;
   an imaging optical system that forms an image of the specimen from a light from the specimen;
   a first spatial modulation element that is disposed in a position of a pupil of the imaging optical system and changes an amplitude transmittance distribution of the light from the specimen;
   an image sensor that detects the image of the specimen by the imaging optical system and outputs a picture signal;
   a calculation section that calculates the amplitude transmittance distribution of the light from the specimen for observing the specimen on the basis of the output data detected by the image sensor and the amplitude transmittance distribution of the light from the specimen formed by the first spatial modulation element,
   wherein the first spatial light modulation element forms the amplitude distribution of the light from the specimen in different shapes sequentially, and
   wherein the calculation section calculates an optimum amplitude transmittance distribution of the light from the specimen to be used for observation of the specimen based on comparison of the output data for each of the different shapes.

2. The microscope system according to claim 1,
   wherein the first spatial modulation element changes the amplitude transmittance distribution of the light from the specimen on the basis of the amplitude transmittance distribution of the light from the specimen calculated by the calculation section.

3. The microscope system according to claim 2,
   wherein the first spatial modulation element changes a spatial distribution of an additional phase which is applied to the light which is transmitted through the imaging optical system.

4. The microscope system according to claim 2,
   wherein the first spatial modulation element changes a spatial distribution of a transmittance which is applied to the light which transmits through the imaging optical system.

5. The microscope system according to claim 1, further comprising:
   a second spatial modulation element that changes an intensity distribution of the illumination light in a conjugate position of the pupil of the imaging optical system,
   wherein the second spatial modulation element is configured by a plurality of movable reflection mirrors.

6. The microscope system according to claim 1, further comprising:
   a second spatial modulation element that changes an intensity distribution of the illumination light in a conjugate position of the pupil of the imaging optical system,
   wherein the second spatial modulation element is configured by a diffraction grating.

7. The microscope system according to claim 1,
wherein a wavelength of the illumination light illuminated to the specimen is changed and the calculation section calculates a wavelength optimum for observing the specimen on the basis of the output data for each the changed wavelengths.

8. The microscope system according to claim 1,
wherein the calculation section calculates a contrast or a spatial frequency of the image of the specimen on the basis of the output data detected by the image sensor.

9. The microscope system according to claim 6,
wherein a shape of a modulation region of a phase or a transmittance by the first spatial modulation element is the same as a shape of the intensity distribution of the illumination light by the second spatial modulation element.

10. The microscope system according to claim 6,
wherein the calculation section synchronously changes both of the first spatial modulation element and, based on this, the second spatial modulation element and calculates the intensity distribution of the illumination light appropriate for observing.

11. The microscope system according to claim 1, further comprising:
a display section that displays a parameter setting portion that sets a parameter for inputting an observation condition, which is requested and allowed by an observer, for an observational image of the specimen, and a region setting portion which sets an observational region of the observational image.

12. The microscope system according to claim 1,
wherein the image sensor is disposed on an imaging plane of the imaging optical system, and detects a picture output data of the specimen, and
wherein the calculation section sequentially calculates an appropriate size of the intensity distribution of the illumination light by minutely changing the distribution of the illumination light and by acquiring the picture output data whenever changing the distribution of the illumination light.

13. The microscope system according to claim 1,
wherein the image sensor is disposed on the imaging plane of the imaging optical system, and detects an output data of the picture of the specimen, and
wherein the calculation section calculates an optimum intensity distribution of the illumination light through a genetic algorithm, which uses output data of first and second pictures as an initial data, by changing the intensity distribution of the illumination light so as to form first and second intensity distributions of the illumination light and by acquiring the output data of the first and second pictures corresponding thereto.

14. A non-transitory computer readable program that observes a specimen by using a microscope system that includes a phase-contrast microscope which observes the specimen and a calculation section which is connected to the microscope, the microscope comprising:
an illumination optical system that illuminates the specimen with an illumination light from a light source;
an imaging optical system that forms an image of the specimen from a light from the specimen;
a first spatial modulation element that is disposed in a position of a pupil of the imaging optical system and changes an amplitude transmittance distribution of the light from the specimen;
an image sensor that detects the image of the specimen by the imaging optical system and outputs a picture signal,
wherein the program makes the calculation section execute a calculation of the amplitude transmittance distribution of the light from the specimen for observing the specimen on the basis of the output data detected by the image sensor and the amplitude transmittance distribution of the light from the specimen formed by the first spatial modulation element,
wherein the program makes the first spatial light modulation element form the amplitude distribution of the light from the specimen in different shapes sequentially, and
wherein the program makes the calculation section calculate an optimum amplitude transmittance distribution of the light from the specimen to be used for observation of the specimen based on comparison of the output data for each of the different shapes.

15. The microscope system according to claim 1, wherein the different shapes are displayed for observation.

16. The non-transitory computer readable program according to claim 14, wherein the different shapes are displayed for observation.

\* \* \* \* \*